(12) United States Patent
Jing et al.

(10) Patent No.: US 10,102,114 B1
(45) Date of Patent: Oct. 16, 2018

(54) CODE TESTING AND APPROVAL FOR DEPLOYMENT TO PRODUCTION ENVIRONMENT

(71) Applicant: Amazon Technologies, Inc., Reno, NV (US)

(72) Inventors: Gang Jing, Mercer Island, WA (US); John Baker, Kirkland, WA (US); Ricardo Rodriguez Munoz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 48 days.

(21) Appl. No.: 15/453,468

(22) Filed: Mar. 8, 2017

(51) Int. Cl.
  G06F 11/36  (2006.01)
  G06F 9/445  (2018.01)
  G06F 8/60   (2018.01)

(52) U.S. Cl.
  CPC ............ *G06F 11/3692* (2013.01); *G06F 8/60* (2013.01); *G06F 11/3688* (2013.01)

(58) Field of Classification Search
  CPC ..... G06F 11/3692; G06F 8/60; G06F 11/3688
  See application file for complete search history.

(56) References Cited

U.S. PATENT DOCUMENTS

| | | | | |
|---|---|---|---|---|
| 6,192,319 B1* | 2/2001 | Simonson | .............. | G06Q 30/02 702/179 |
| 6,237,059 B1* | 5/2001 | Dean | ..................... | G06F 9/4881 711/100 |
| 6,351,803 B2* | 2/2002 | Peng | ..................... | G06F 9/3824 712/216 |
| 2009/0064149 A1* | 3/2009 | Singh | ..................... | G06F 11/263 718/101 |
| 2011/0307860 A1* | 12/2011 | Park | ......................... | G06F 8/30 717/107 |

OTHER PUBLICATIONS

Kanawati et al.; FERRARI: a tool for the validation of system dependability properties, 1992.*
Bondavalli et al. Design validation of embedded dependable systems, 2001.*

* cited by examiner

*Primary Examiner* — Viva Miller
(74) *Attorney, Agent, or Firm* — Lowenstein Sandler LLP

(57) ABSTRACT

A system for testing candidate code to determine if the candidate code is approved for deployment to a production environment. The system may include a code testing engine configured to test a first code set of previously approved code to a testing server and a production environment including multiple production servers. At a deployment time, the code testing engine may then deploy candidate code to the testing server, while the production servers execute the first code set. Performance data for a time period before the deployment time and after the deployment time is collected. Latency data sets are fetched from the performance data sets and compared using multiple statistical tests. If the multiple statistical tests generate passing results, the candidate code is approved for deployment to the production environment.

17 Claims, 5 Drawing Sheets

CODE TESTING AND APPROVAL FOR DEPLOYMENT TO PRODUCTION ENVIRONMENT

BACKGROUND

Web services and applications often require high quality delivery to end users, particularly in an e-commerce context supporting order processing on behalf of a large number of customers. A stage of the deployment pipeline may include testing the code prior to actual deployment of the code in a production environment. Conventionally, a manually intensive review of the performance of candidate code in a testing environment is performed to determine if the new code introduces unacceptable levels of latency.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

Figure 1:
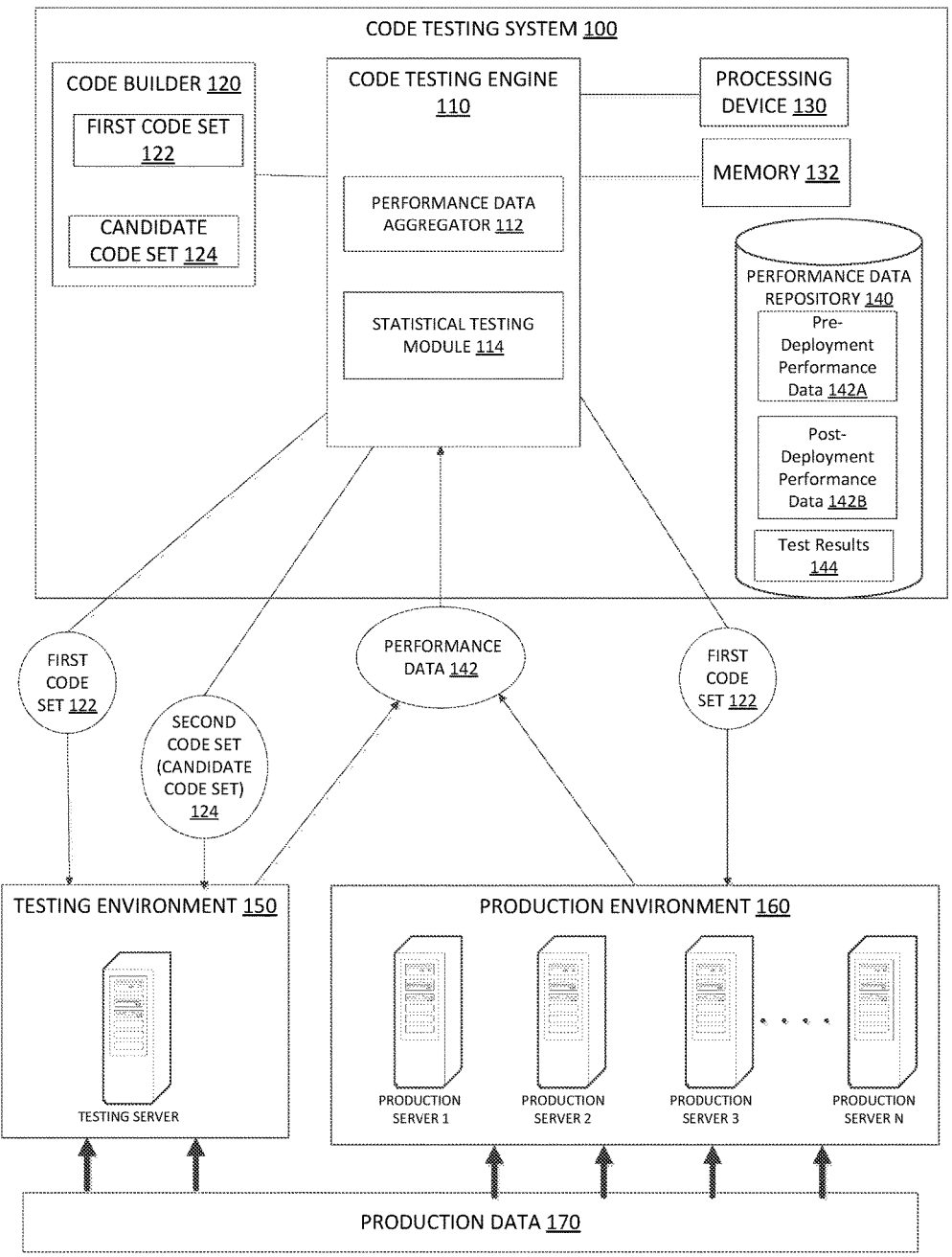
FIG. 1 illustrates an example system to test candidate code for deployment in a production environment, according to one embodiment.

Embodiments described herein relate to testing and monitoring candidate code using a testing server processing production data prior to deployment in a production environment. In one embodiment, a testing server and multiple production servers in a production environment process production data (i.e., production traffic) by executing a first code set during a first portion of an overall execution time period (also referred to as a "pre-deployment phase or time period"). In one embodiment, performance data associated with the execution of the first code set (e.g., a control code set) by the testing server and the production servers is collected and stored during the pre-deployment phase (also referred to as "pre-deployment performance data").

In one embodiment, candidate code that is to be evaluated is identified for testing in the isolated testing server. In one embodiment, the candidate code is deployed to the testing server and executed during a second portion of the execution period (also referred to as the "post-deployment phase or time period"). During the post-deployment time period, the candidate code (or "second code set") is executed by the testing server, while the first code set continues to be executed by the production servers, according to embodiments. Performance data associated with the execution of the candidate code set by the testing server and the first code set by the production servers is collected and stored during the post-deployment time period (also referred to as the "post-deployment performance data").

Advantageously, in one embodiment, the particular time the candidate code is deployed to the testing server (also referred to as the "deployment time") is identified and used to define the pre-deployment performance data and the post-deployment performance data. In one embodiment, multiple different statistical tests may be applied to compare the pre-deployment performance data and the post-deployment performance data. In one embodiment, the comparison of the two data sets provides for an accurate measurement and analysis of the impact on performance related to the provisioning and executing of the candidate code. In one embodiment, a first statistical test includes a student t-test (also referred to as a "t-test") to determine if the two data sets (i.e., the pre-deployment performance data and the post-deployment performance data) are significantly statistically different from one another. In one embodiment, in particular, an average latency of the pre-deployment performance data is compared to an average latency of the post-deployment performance data using the t-test to determine an amount or level of latency variants. For example, by applying the t-test, it can be determined that, given two averages (i.e., the average latency of the pre-deployment performance data and the average latency of the post-deployment performance data), are the averages drawn from the same samples and what is a confidence level associated with that determination. In one embodiment, if it is determined that the statistical difference between the two averages is significant (i.e., exceeds a first test threshold value), then it is determined that the candidate code caused a significant latency and a test failure alarm is generated.

In addition, a second statistical test including a linear regression test is applied to the latency data to determine a statistical relationship between the average latency of the pre-deployment performance data and the average latency of the post-deployment performance data. For example, the linear regression test may be applied to determine whether there is a slope representing a change in a mean value of the average latency in the pre-deployment performance data and the post-deployment performance data. In one embodiment, if a slope value (either going up or down) exceeds a second test threshold value then it may be determined that the difference in latency due to the candidate code is significant and a test failure alarm may be generated.

The combination of the multiple statistical tests (e.g., the t-test and the linear regression test) results in an added confidence relating to the identification of the level of latency associated with the candidate code executed by the testing server. This enables a determination of whether the pre-deployment latency data set and the post-deployment data set are significantly different for each other. Furthermore, any latency regression may be isolated to the testing server, thereby reducing a blast radius of latency due to "bad" candidate code by preventing its deployment to production servers.

In the following discussion, embodiments of the system and its components are described. Although the description includes certain examples relating to the identification of latency or average latency information from the aggregated performance data, it is to be appreciated that the system is not limited to the enumerated examples. According to embodiments, other performance metrics such as, for example, memory utilization, network throughput, bandwidth, completion time, etc. may be considered and analyzed according to the processes of the present disclosure.

FIG. 1 illustrates an example of a code testing system 100 for collecting performance data 142 from a testing environment 150 and a production environment 160. The code testing system 100 includes a code testing engine 110 configured to provision a first code set 116 to an operatively coupled testing environment 150 and a production environment 160. As shown in FIG. 1, the production environment 160 may have multiple production servers (e.g., production server 1, production server 2, production server 3, and production server N) configured to execute a first code set 116 and process production data 170 (also referred to as "production traffic") during an execution time period. Also as shown, the testing environment 150 may include a testing server (e.g., a single testing server or a cluster of related testing servers) configured to execute the first code set 116 during a first portion of the execution time period. At a time during the execution time period, the code testing engine 110 provisions the candidate code set 124 (also referred to as a second code set) to the testing server. The time the second code set 118 is deployed to the testing server is referred to herein as the "deployment time." Both prior to and following the deployment time, the production servers of the production environment 160 execute the first code set while processing the production data 170. During a first portion of the execution time period (i.e., the portion before the deployment time, also referred to as the "pre-deployment time period"), the testing server executes the first code set 122 while processing the production data 170. After the deployment time, the testing server executes the candidate code set 124.

In one embodiment, the code testing system 100 may include a code builder 120 configured to provide the first code set 122 and the candidate code set 124 to the code testing engine 110. The first code set which includes code that is to be tested prior to deployment in the production environment 160.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to the use of a server is merely by way of example, and other suitable computing devices known to those of skill in the art may be employed.

Code testing engine 110 may be part of a code testing system 100 that conforms to any of a wide variety of architectures. The functionality and components of the code testing system 100 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of code sets, including code developers, etc.

The functionality described herein also may be implemented by one or more different entities. For example, the functionality to test the code may be performed by a first entity while the building or generating of the code may be performed by a separate entity.

The code testing system 100 may include one or more computing devices including a processing device 130 and a memory 132 configured to execute instructions associated with the functionality of the code builder 120 and the code testing engine 110, as described in greater detail below in connection with FIGS. 2-4.

In the example arrangement shown in FIG. 1, the production data 170 may come from any suitable source, such as a network of computing devices configured to provide production requests to a web service or web platform in a "live" or actual production environment. For example, the production data 170 may include information exchange and processing relating to an e-commerce platform (e.g., a website, a web application, etc.) relating to multiple customer activities, including, for example, purchases.

In one embodiment, the code testing engine 110 may include a performance data aggregator 112 and a statistical testing module 114. The performance data aggregator 112 is configured to execute instructions to receive the performance data 142 from the testing server and the production servers, identify the deployment time of the candidate code set, and identify pre-deployment performance data 142A and post-deployment performance data 142B. The pre-deployment performance data 142A represents a portion of the performance data 142 that relates to execution of the first code set by the testing server and the production servers during a first phase of the execution time period spanning from the beginning of the execution time period to the deployment time. In one embodiment, the first phase of the execution time period may be referred to as the "bake" time in that it represents a time wherein the first code set (i.e., code that previously passed the testing phase and is considered production-ready) is executed on both the testing and production servers to generate a control set for purposes of the data comparison, as described in greater detail below.

The post-deployment performance data 142B represents a portion of the performance data 142 associated with execution of the candidate code set 124 by the testing server and execution of the first code set 122 by the production servers 160 during a portion of the execution time period following the deployment time.

In one embodiment, the statistical testing module 114 applies multiple statistical tests comparing the pre-deployment performance data 142A and the post-deployment performance data 142B. The statistical testing module 114 may include computer-executable instructions configured to apply multiple different statistical tests to the pre-deployment performance data 142A and the post-deployment performance data 142B to generate test results 144. The test results may represent a measure of a level of latency associated with the candidate code as compared to the level of latency associated with the execution of the first code set (e.g., the control code set).

The statistical testing module 114 fetches or determines a first average latency associated with the pre-deployment performance data 142A. The statistical testing module 114 also fetches or determines a second average latency associated with the post-deployment performance data 142B. The average latency of the respective data set may be fetched, calculated, determined, or derived according to a suitable technique in the art.

In one embodiment, the statistical testing module 114 is configured to apply a student t-test (also referred to as a "t-test") to compare the first average latency (associated with execution of the first code set) and the second average latency (associated with execution of both the first code set by the production servers and the candidate code set by the testing server). The t-test is used to determine if the two data sets (i.e., the pre-deployment performance data 142A and the post-deployment performance data 142B) are statistically significant. For example, if the test results indicate that the two data sets are statistically significant, then it is determined that the pre-deployment and post-deployment data exhibit a same or statistically similar latency. In one embodiment, application of the t-test produces a first test threshold value.

In an example, the test results associated with the t-test may provide a t-test value (or first test threshold value) that is compared to a test threshold value. If the t-test value exceeds the test threshold value (i.e., a first test threshold value), it may be determined that the t-test failed. In one embodiment, failure of the t-test may indicate that the average latency of the post-deployment performance data is statistically different from the average latency of the pre-deployment performance data such that it is determined that the candidate code set caused latency exceeding an acceptable level or amount.

In one embodiment, the t-test indicates whether the two averages (i.e., the average latency of the pre-deployment performance data 142A and the average latency of the post-deployment performance data 142B are drawn from the same sample (i.e., samples that correspond in terms of request size or other factors impacting latency) and a confidence level associated with the t-test results.

In one embodiment, the statistical testing module 114 applies a second statistical test to the pre-deployment performance data 142A and the average latency of the post-deployment performance data 142B. In one embodiment, the second statistical test is a linear regression test used to complement the t-test. In one embodiment, the linear regression test may include a calculation of a slope or gradient that represents a direction (e.g., up or down) and steepness associated with the average latency as it relates to the pre-deployment performance data 142A and the post-deployment performance data 142B. Any suitable linear regression test and techniques may be employed in connection with embodiments of the present disclosure.

In one embodiment, application of the linear regression test produces a test result (e.g., a second test result or second statistical comparison value) that may be compared to a test threshold associated with the test (i.e., a second test threshold). In one embodiment, the statistical testing module 114 compares the second test result to the second test threshold and determines a failure of the second test failed if the second test result exceeds the second test threshold. In one embodiment, if the second test result does not exceed the second test threshold, the statistical testing module 114 determines that the second test passed and the candidate code may be approved for deployment to the full production environment 160.

As described in detail below with respect to FIG. 2, the first statistical test and the second statistical test may be applied serially or in parallel. In one example, the first statistical test is applied first and, if the test passes, the second statistical test is applied. In the event that either the first statistical test or the second statistical test fails, a test alarm is generated and deployment of the candidate code to the production environment 160 is prevented. It is noted that although a t-test and linear regression test are described in detail herein, other statistical tests may be employed in addition to these tests or as alternatives to these tests. In one embodiment, upon determining that both the t-test and linear regression test passed, the candidate code may be automatically deployed to the production environment 160.

As illustrated in FIG. 1, the code testing system 100 includes a performance data repository 140 configured to store the pre-deployment performance data 142A, the post-deployment performance data 142B, and the test results (e.g., the first test results and the second test results) generated by the statistical testing module 114. In one embodiment, the code testing system 100 may further include a user interface (not shown) configured to display the test results 144 and test alarms to a user.

Figure 2:
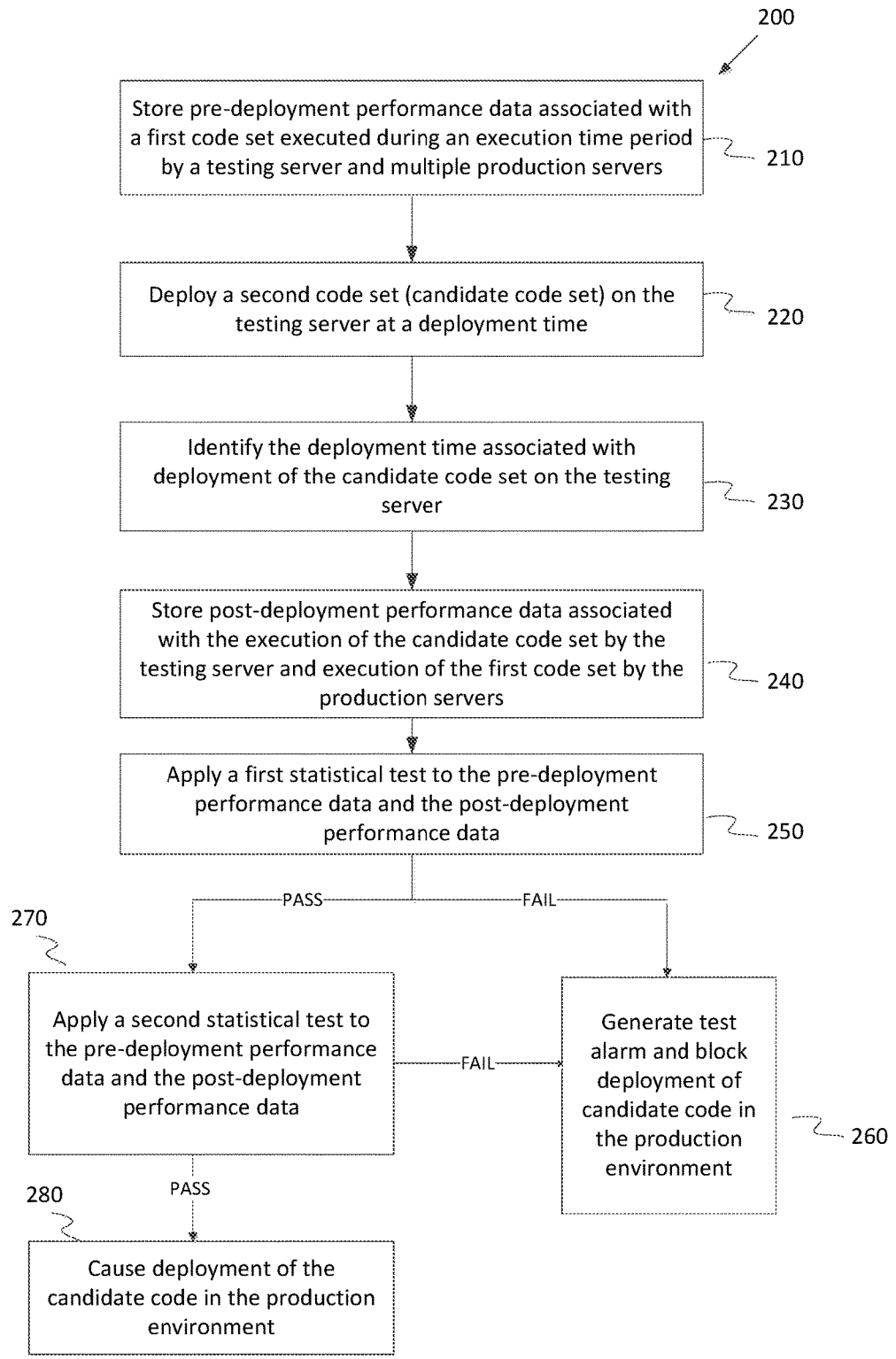
FIG. 2 depicts a flowchart illustrating an example of functionality implemented by a code testing system, according to one embodiment.

FIG. 2 illustrates a flowchart that provides an example of a process 200 executed by a code testing system (e.g., code testing system 100 of FIG. 1), according to various implementations of the present disclosure. It is understood that the flowchart of FIG. 2 provides an example of the many different types of functional arrangements that may be employed to implement the operation of the code testing system 100 including a code testing engine (e.g., code testing engine 110 of FIG. 1) as described herein.

As described above, a first code set (e.g., a control code set) is executed by a testing server (e.g., a single server operated in isolation relative to the production servers) and multiple production servers. In one embodiment, the first code set represents code that has previously been tested and approved for production. In one embodiment, the testing server and the production servers execute the first code set in the processing of actual production data (i.e., production traffic).

In block 210, pre-deployment performance data associated with the execution of the by the testing server and the multiple production servers is generated, collected, and stored. Since the pre-deployment performance data relates to execution of the previously tested and approved first code set, the pre-deployment performance data can serve as a control data set for comparison purposes, as described in detail below.

In one embodiment, the pre-deployment performance data may include information associated with the performance of the first code set as it is executed by the testing server and the production servers, including, but not limited to, latency data, memory usage, error counts, request failures, etc. In one embodiment, the pre-deployment performance data may be collected and stored during a first time period of an overall testing or execution period. In one embodiment, the first time period may be marked by a starting point and continue to a deployment time of the second code set, as described below. In one embodiment, the length of the first time period may be selected by the system or as an adjustable variable selectable by a user of the system. The first time period (i.e., a length of time when the first code set is executed by the testing server and the production servers) may be any suitable length of time, such as, for example, 5 hours, 10 hours, 15 hours, etc.

In block 220, a second code set including a candidate code set is deployed on the testing server at the deployment time. As noted above, the time of the deployment of the second code set marks the end of the first time period. The second code set may be comprised partially or wholly of candidate code (i.e., new code that is being tested or evaluated for purposes of determining whether the candidate code is ready for deployment in the production environment). In one embodiment, the candidate code set is deployed on the testing server at the deployment time, while the production servers continue to execute the first code set.

In block 230, the deployment time associated with deployment of the second code set on the testing server is identified. Advantageously, in one embodiment, the precise time of the deployment may be determined to enable the system to take a full set of performance data and identify the pre-deployment performance data and the post-deployment performance data portions thereof. In one embodiment, a "rate of change" does not need to be estimated since the instance of the deployment time is identified. In addition, in one embodiment, since the pre-deployment performance data and the post-deployment performance data are distinguishable from one another in view of the deployment time, the code testing engine may be executed at any time to perform the functionality described herein. In one embodiment, this provides a benefit of not needing to execute the code testing engine in temporal proximity to the deployment time, but instead may be run any time after the deployment time.

In block 240, having identified the deployment time, the post-deployment performance data associated with execution of the candidate code set by the testing server and execution of the first code set by the production servers is stored. As noted above, the aggregate performance data (i.e., including the "pre-deployment" and "post-deployment" data) may be collected and stored over a period of time (e.g., the execution period) such that the categories of the data (pre-deployment vs post-deployment) can be identified at any time following the collection based on the identification of the deployment time. For example, during a 15 hour period (e.g., the execution time), performance data may be collected and stored, wherein the candidate code is deployed on the testing server at the 8 hour mark of the 15 hour period. In one embodiment, the longer the execution time, the greater number of samples and the fewer number of false positives that may be identified and used during the statistical comparison portion of the methodology, as described below. In this example, following the 15 hour period, the code testing engine may identify the deployment time at the 8 hour mark and categorize the portion of performance data collected prior to that time as the "pre-deployment performance data" and the portion of the performance data collected after the deployment time as the "post-deployment performance data".

In one embodiment, the first average latency data (relating to the pre-deployment performance data) and the second average latency data (relating to the post-deployment performance data) may be normalized prior to application of the statistical tests. Normalizing the two latency data sets advantageously accounts for variations in latency that may be due to factors such as production traffic changes throughout the day. In one embodiment, by normalizing the two latency data sets, the code testing engine is able to generate "normalized latency data sets" that are significantly comparable by the statistical tests described herein.

In one embodiment, the latency data sets are normalized to account for changes in the average latency experienced by the testing server and the production servers throughout the execution period. For example, the greater the level of production traffic being processed, the lower the average latency. Conversely, the lower the level of production traffic (e.g., during an off-peak time) being processed, the higher the average latency. In one embodiment, the production data (or traffic) level may be normalized throughout the execution period to account for these changes in peak and off-peak traffic levels.

In another implementation, the production traffic processed by the testing server may be normalized against the production traffic processed by the production servers to account for differences in the amount and type of production traffic experienced by the two server groups. For example, by normalizing the latency data sets a more accurate representation of the latency may be achieved that accounts for the variations in traffic based on the time of day, etc. Advantageously, the two latency data sets may be normalized based on the number of requests handled by the testing server versus the production servers to account for peak and off-peak variations.

In block 250, a first statistical test is applied to compare the pre-deployment performance data and the post-deployment performance data. In one embodiment, a first average latency data may be fetched or otherwise derived from the pre-deployment performance data. In addition, a second average latency data may be fetched or otherwise derived from the post-deployment performance data. Then, the first statistical test may be applied to compare the first average latency data to the second average latency data.

In one embodiment, the first statistical test may be a student t-test applied to determine if the samples upon which the first average latency data and the second average latency data were drawn are statistically the same. In one embodiment, the student t-test results in a test threshold value representing whether the two average latency data sets are statistically equivalent or is there is significant difference between the two average latency data sets. In one embodiment, the student t-test, which takes into account a number of data points available in the data set, is applied to the normalized latency data sets to achieve a more accurate statistical comparison. For example, during an off-peak period, there are fewer data points. In one embodiment, during the application of the student t-test, a rule may be established that calls for the first average latency and the second average latency to be closer together to determine that the two averages are statistically equivalent.

In block 250, application of the first statistical test (e.g., the student t-test) results in the generation of a first test threshold value (e.g., the test results). The first test threshold value may then be compared to a first test threshold value to determine if the first statistical test passes or fails. The first test threshold value may be any adjustable value selected by the system or a user to set a threshold amount (or range) that can be used to compare the results of the first statistical test. In one embodiment, if the first test threshold value exceeds the first test threshold value, then the coding testing engine determines that the first statistical test failed. If, alternatively, the first test threshold value is less than or equal to the first test threshold value, then the coding testing engine determines that the first statistical test passed.

As shown in FIG. 2, if it is determined that the first statistical test failed, the process 200 proceeds to block 260. In block 260, a test alarm is generated and deployment of the candidate code in the production environment is prevented. In one embodiment, the test alarm may be generated and caused to be display via a graphical user interface. In addition, the test results from the first statistical test may be generated, logged, and caused to be displayed via a graphical user interface.

As shown in FIG. 2, if the first statistical test passes, the process 200 may proceed to block 270. In block 270, a second statistical test is applied to compare the pre-deployment performance data and the post-deployment performance data. In one embodiment, the second statistical test is a linear regression test. According to one embodiment of the present disclosure, the linear regression test may be applied to determine whether there is a slope representing a change in a mean value of the average latency in the pre-deployment performance data and the post-deployment performance data. In one embodiment, if a slope value (either going up or down) exceeds a second test threshold value then it may be determined that the difference in latency due to the candidate code is significant and the second statistical test failed. In one embodiment, in the event that the second test (e.g., the linear regression test) fails, the process 200 proceeds to block 260 and a test alarm is generated to cause the blocking of deployment of the candidate code in the production environment.

If, in block 270, it is determined that the second statistical test passed, then the process 200 proceeds to block 280. In block 280, in view of the passing of both the first statistical test and the second statistical test, the candidate code is caused to be deployed in the production environment. In one embodiment, the candidate code may be automatically deployed in the production environment by the code testing engine upon determining the passing of both statistical tests. In another implementation, the candidate code may be caused to be deployed in the production environment by generating and displaying a message via a graphical user interface that alerts a user of the passing of both statistical tests.

In one embodiment, the first statistical test applied may be the linear regression test and the second statistical test applied may be the student t-test. In yet another implementation, the first statistical test and the second statistical test may be applied in parallel, as compared to the serial approach shown in FIG. 2.

Figure 3:
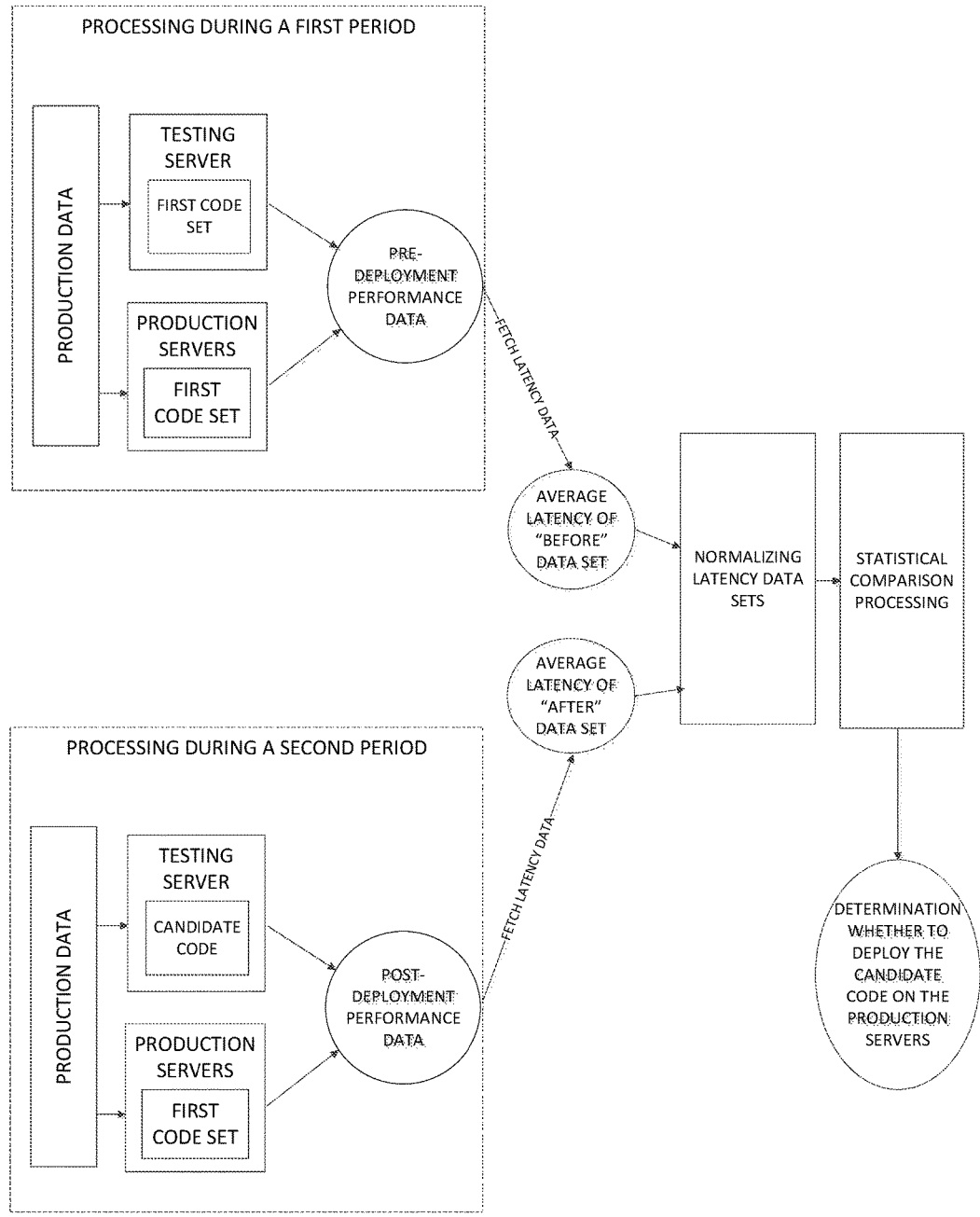
FIG. 3 illustrates example functionality implemented by a code testing system, according to one embodiment.

FIG. 3 presents a schematic diagram illustrating exemplary processing performed by a code testing engine according to implementations of the present disclosure. As shown, during a first time period, the code testing engine monitors the execution of a first code set by both a testing server and multiple production servers. In one embodiment, the testing server and the production servers process production data provided from a "live" environment, such as a web service platform or application processing user or customer requests. In one embodiment, during the first time period, performance data including information that can be used to calculate, generate, or derive latency data is generated and collected. The performance data collected during the first time period relates to the execution of the first code set which represents code that has previously been tested and approved.

As shown in FIG. 3, during a second time period, the testing server executes candidate code that was deployed to the testing server at a "deployment time." The deployment time may be determined after the completion of the execution time (i.e., the first time and the second time) and used to demarcate the portion of the performance data that is defined as the "pre-deployment performance data" and the portion of the performance data that is defined as the "post-deployment performance data".

In one embodiment, first average latency data may be fetched from the stored pre-deployment performance data. The first average latency data, or "before" data set, represents the latency metrics relating to execution of the first code set (i.e., previously tested and approved code) by the testing server and the production servers (e.g., a "before" data set). Second latency data may be fetched from the post-deployment performance data. The second average latency data, or "after" data set, represents the latency metrics relating to execution of the second code set (i.e., including new candidate code) by the testing server and the first code set by the production servers.

Figure 4:
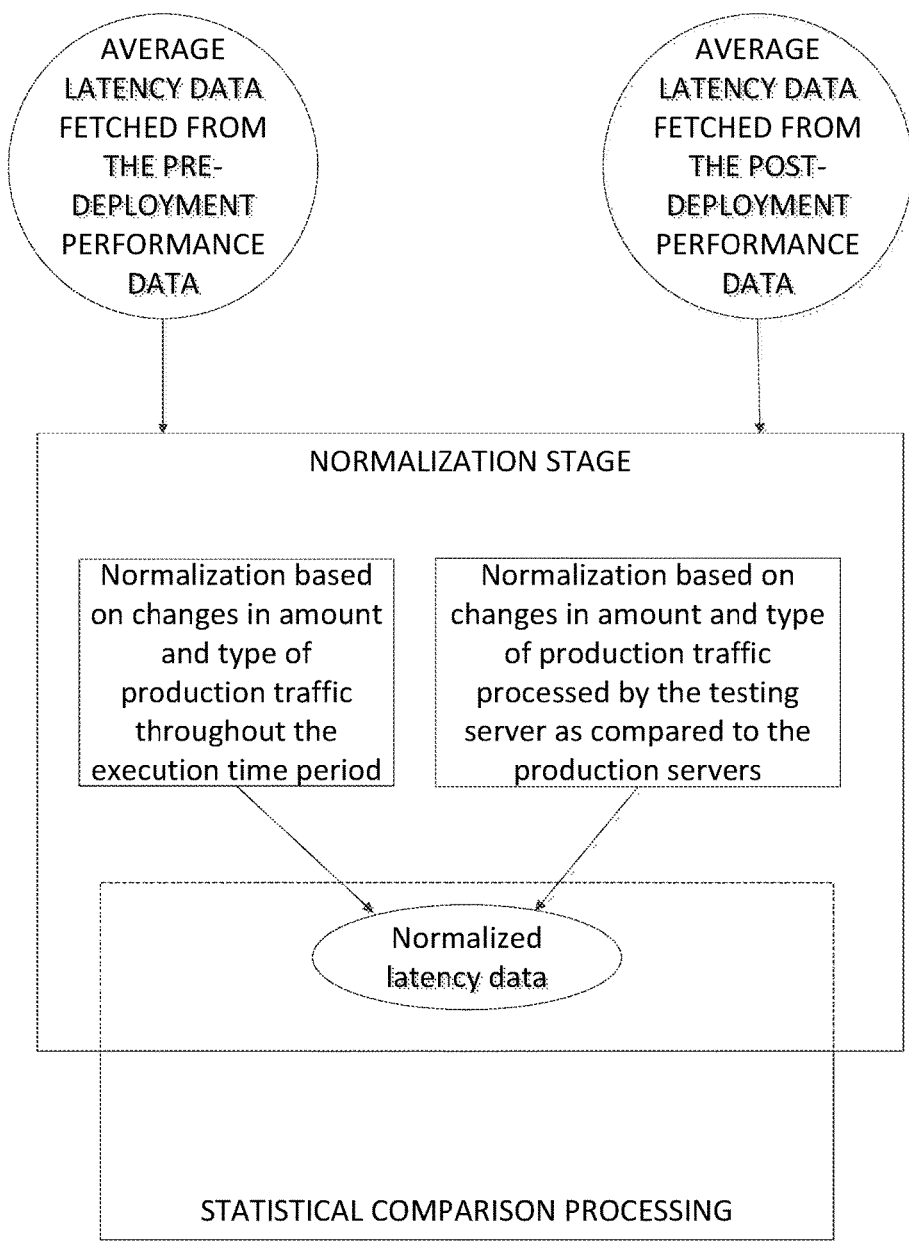
FIG. 4 illustrates example functionality implemented by a code testing system, according to one embodiment.

As shown in FIG. 4, in one embodiment, the average latency of the before data set (i.e., the average latency derived from the pre-deployment performance data) and the average latency of the "after" data set (i.e., the average latency derived from the post-deployment performance data) are normalized during a normalization stage. In one embodiment, the normalizing of the latency data may be performed prior to the statistical comparison processing or as part of the statistical comparison processing. For example, application of the student t-test includes as part of the test a normalizing of the latency data sets. In one embodiment, at least a portion of the normalization of the latency data sets may be performed as part of the statistical comparison processing, as illustrated by the dashed line in FIG. 4. For example, application of a student t-test to compare the average latency data sets may include normalization of the data as part of the student t-test analysis.

In one embodiment, normalization of the latency data sets includes pulling or otherwise receiving the two latency data sets and applying a selected latency standard or percentile (e.g., P50 latency, P90 latency, P99 latency, P100 latency). For example, if a latency standard of P99 is applied, it is established that 99% of the requests should be faster than a given latency (i.e., 1% of the requests are permitted to be slower than the given latency).

In one embodiment, to normalize the second latency data set relating to the post-deployment performance data, data points from the production servers are retrieved. Multiple corresponding data points are then retrieved from the testing server (executing the candidate code) and matched to the first set of data points (from the production servers). For example, each data point may be separated by a particular time interval (e.g., there may be a data point at each 1 minute interval).

In one embodiment, for each pair of corresponding data points (from testing and production), a difference in the values of the corresponding data points are calculated. In one embodiment, the determination of a difference in value between corresponding data points from the testing and production environments may be performed for multiple different latency percentiles (e.g., P50 latency, P90 latency, P99 latency, P100 latency). The determination of the differences in the corresponding data points generates a data set representing the differences in values of the various data points each interval of time (e.g., 1 minute intervals). In one embodiment, the normalized data set including the determined differences may be provided to the statistical comparison processing stage. In one embodiment, if there is no data point in the testing environment that corresponds to a data point in the production environment, the data point may be omitted from the latency data set that is provided to the statistical processing stage.

In one embodiment, the first average latency data (relating to the pre-deployment performance data) and the second average latency data (relating to the post-deployment performance data) may be normalized prior to application of the statistical tests. In one embodiment, normalizing the two latency data sets advantageously accounts for variations in latency that may be due to factors such as production traffic changes throughout the day. In one embodiment, by normalizing the two latency data sets, the code testing engine is able to generate "normalized latency data sets" that are significantly comparable by the statistical tests described herein.

In one embodiment, the latency data sets are normalized to account for changes in the amount and type of traffic and requests received by the testing server and the production servers throughout the execution period. For example, in the normalizing phase, the production data (or traffic) level may be normalized throughout the execution period to account for these changes in peak and off-peak traffic levels.

In another example, the latency data sets may be normalized to generate a more accurate representation of the latency due to variations in traffic based on the time of day, etc. Advantageously, in one embodiment, the two latency data sets may be normalized based on the number of requests handled by the testing server versus the production servers to account for peak and off-peak variations.

In one embodiment, following normalization, the normalized latency data undergoes statistical comparison processing. In the statistical comparison processing stage, multiple statistical tests are applied to the latency data sets. In one embodiment, a student t-test and a linear regression test are applied. In one embodiment, the test results from the two statistical comparison tests may be compared to respective thresholds (i.e., a first threshold and a second threshold) to determine if one or more of the tests failed or if both tests passed. In one embodiment, based on the test results and comparison to the threshold values, a determination is made whether to deploy the candidate code on the production servers. In one embodiment, the failure of either of the test may result in a test alarm that notifies the system or a user that deployment of the candidate code on the production servers is to be prohibited.

In one embodiment, in the event that both tests pass, a determination is made to deploy the candidate code to the production servers. For example, the determination may be made by presenting a message via a graphical user interface indicating that both statistical tests passed and that the candidate code is approved by the code testing engine for deployment. In another example, upon the passing of both of the statistical tests, the code testing engine may automatically schedule the deployment of the candidate code in the production environment or execute the deployment of the candidate code in the production environment.

Figure 5:
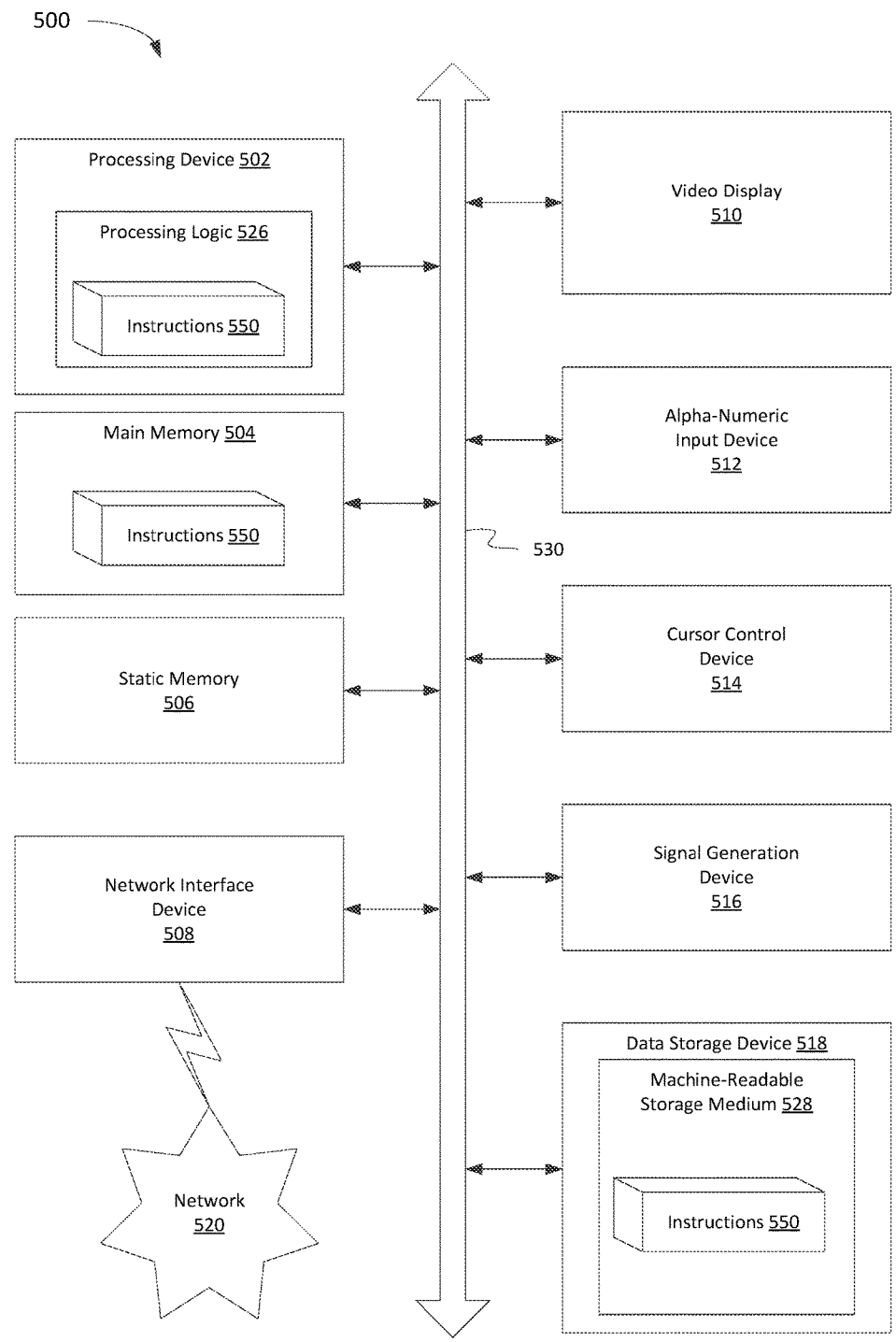
FIG. 5 is a schematic block diagram that provides an example illustration of a computing environment executing instructions relating to testing candidate code, according to one embodiment.

FIG. 5 illustrates a diagrammatic representation of a machine in the example form of a computer system 500 within which a set of instructions 550, for causing the machine to perform any one or more of the methodologies discussed herein, may be executed. In one embodiment, the instructions 550 may enable execution of process 200 of FIG. 2 by a code testing system (e.g., code testing system 100 in FIG. 1). In another implementation, the instructions 550 may enable the processing shown and described in connection with FIG. 3.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein. In one embodiment, computer system 500 may represent code testing system 100 of FIG. 1.

The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. In various implementations of the present disclosure, the processing device 502 is configured to execute instructions for a code testing system 100 including a code testing engine 110 for performing the operations and processes described herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium 528 on which is stored one or more sets of instructions of the code testing system 100 embodying any one or more of the methodologies or functions described herein. The instructions may also reside, completely or at least partially, within the main memory 504 and/or within processing logic 526 of the processing device 502 during execution thereof by the computer system 500, the main memory 504 and the processing device 502 also constituting computer-readable media.

The instructions may further be transmitted or received over a network 520 via the network interface device 508. While the computer-readable storage medium 528 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely presented as examples. Particular implementations may vary from these example details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "deploying", "identifying", "determining", "applying", "causing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    storing pre-deployment performance data associated with a first code set comprising previously approved code executed during a first time period by a testing server and a plurality of production servers processing production data;
    deploying, by a processing device, a second code set comprising a candidate code set on the testing server;
    identifying a deployment time associated with deployment of the second code set comprising the candidate code set on the testing server;
    storing post-deployment performance data associated with the second code set comprising the candidate code set executed during a second time period following the deployment time by the testing server processing production data and the first code set executed during the second time period by the plurality of production servers processing production data;
    identifying a first average latency data set from the pre-deployment performance data;
    identifying a second average latency data set from the post-deployment performance data;
    applying a student t-test to the first average latency data set and the second average latency data set to generate a first statistical comparison value;
    determining the first statistical comparison value is less than a first test threshold value;
    applying a linear regression test to the first average latency data set and the second average latency data set to generate a second statistical comparison value;
    determining the second statistical comparison value is less than a second test threshold value; and
    causing deployment of the second code set comprising the candidate code set on the plurality of production servers.

2. The method of claim 1, further comprising normalizing the first average latency data set and the second average latency data set prior to applying the student t-test and the linear regression test.

3. The method of claim 1, further comprising generating a message comprising information indicating a passing of the student t-test and the linear regression test.

4. A system comprising:
    a processing device; and
    memory to store computer-executable instructions that, if executed, cause the processing device to:
        identify a first average latency data set from pre-deployment performance data associated with a first code set executed during a first time period by a testing server and a plurality of production servers;
        deploy, at a deployment time, a second code set comprising candidate code on the testing server;
        identify a second average latency data set from post-deployment performance data associated with the second code set comprising the candidate code executed during a second time period following the deployment time by the testing server and the first code set executed during the second time period by the plurality of production servers;
        apply at least one of a student t-test or a linear regression test to the first average latency data set and the second average latency data set;

determine at least one of the student t-test or the linear regression test produces a test result exceeding at least one test threshold value; and prevent deployment of the second code set comprising the candidate code on the plurality of production servers.

5. The system of claim 4, the processing device to normalize the first average latency data set and the second average latency data set.

6. The system of claim 4, the processing device to generate a comparison of a first set of data points from the first average latency data set occurring during an off-peak time period to a second set of data points from the second average latency data set occurring during the off-peak time period.

7. The system of claim 4, the processing device to generate an alarm indicating the test result exceeds the at least one test threshold value.

8. The system of claim 4, the processing device to fetch the first average latency data set from the pre-deployment performance data.

9. The system of claim 4, wherein the first code set comprises code previously tested and approved for deployment to the plurality of production servers.

10. The system of claim 4, the processing device to determine the deployment time of the second code set comprising the candidate code.

11. The system of claim 4, the processing device to generate a report comprising the test result.

12. A non-transitory computer-readable storage device storing computer-executable instructions that, if executed by a processing device, cause the processing device to:

generate a first average latency data set from pre-deployment performance data associated with a first code set executed by a testing server and a plurality of production servers;

identify a deployment time associated with deployment of a second code set comprising candidate code on the testing server;

generate a second average latency data set from post-deployment performance data associated with the second code set executed by the testing server and the first code set executed by the plurality of production servers;

apply a student t-test and a linear regression test to compare the first average latency data set to the second average latency data set;

determine the student t-test and the linear regression test generate passing results; and cause deployment of the second code set comprising the candidate code on the plurality of production servers.

13. The non-transitory computer-readable storage device of claim 12, the processing device to:

calculate a first test value from the student t-test;

compare the first test value to a first test threshold value; and determine the first test value is less than or equal to the first test threshold value.

14. The non-transitory computer-readable storage device of claim 13, wherein the first test threshold value is selected via a graphical user interface.

15. The non-transitory computer-readable storage device of claim 12, the processing device to:

calculate a second test value from the linear regression test;

compare the second test value to a second test threshold value; and determine the second test value is less than or equal to the second test threshold value.

16. The non-transitory computer-readable storage device of claim 12, the processing device to generate a message indicating the candidate code is approved for deployment on the plurality of production servers.

17. The non-transitory computer-readable storage device of claim 12, the processing device to normalize the first average latency data set and the second average latency data set prior to applying the student t-test and the linear regression test.

* * * * *